Figure 1:
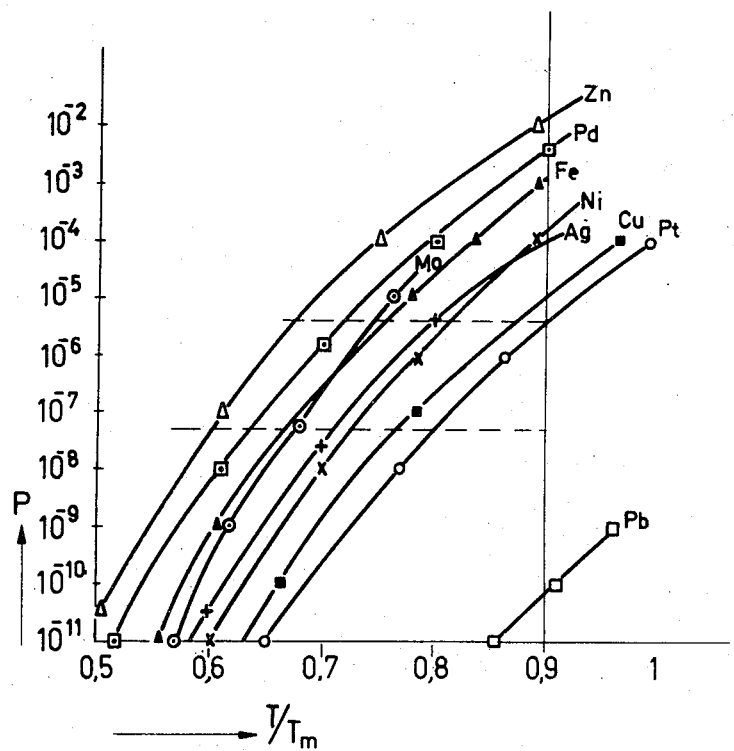

United States Patent [19]

Klomp

[11] 3,722,074
[45] Mar. 27, 1973

[54] METHOD OF SEALING A METAL ARTICLE TO A GLASS ARTICLE IN A VACUUM-TIGHT MANNER

[75] Inventor: Johannes Theodorus Klomp, Emmasingel, Eindhoven, Netherlands

[73] Assignee: U.S. Philips Corporation, New York, N.Y.

[22] Filed: Apr. 13, 1970

[21] Appl. No.: 27,605

[30] Foreign Application Priority Data

Apr. 21, 1969 Netherlands ..................6906150
Oct. 25, 1969 Netherlands ..................6916130

[52] U.S. Cl. ..................................29/472.9, 29/504
[51] Int. Cl. .............................................B23k 31/02
[58] Field of Search.................29/471.9, 472.9, 504; 287/189.365

[56] References Cited

UNITED STATES PATENTS

| | | | |
|---|---|---|---|
| 2,964,839 | 12/1960 | Marafroti et al | 29/504 X |
| 3,131,460 | 5/1964 | Allen | 29/504 X |
| 3,252,722 | 5/1966 | Allen | 29/504 X |
| 3,256,598 | 6/1966 | Kramer et al | 29/504 X |
| 3,397,278 | 8/1968 | Pomerantz | 29/589 X |
| 3,417,459 | 12/1968 | Pomerantz et al | 29/472.9 |
| 3,577,629 | 5/1971 | Wallis | 29/472.9 |
| 3,635,510 | 1/1972 | Stoller et al | 29/472.9 X |

FOREIGN PATENTS OR APPLICATIONS 926,021  9/1959  Great Britain..................29/472.9

*Primary Examiner*—J. Spencer Overholser
*Assistant Examiner*—Ronald J. Shore
*Attorney*—Frank R. Trifari

[57] ABSTRACT

A method of sealing articles having metal and glass sealing surfaces in a vacuum-tight manner. The joint is established by heating the surfaces under pressure until welding occurs at temperatures which are lower than the softening point of the glass and which lie between the temperature at which the vapor tension of the metal is equal to $10^{-10}$ Torr and the temperature which is the melting point of the metal.

5 Claims, 2 Drawing Figures

METHOD OF SEALING A METAL ARTICLE TO A GLASS ARTICLE IN A VACUUM-TIGHT MANNER

The invention relates to a method of sealing articles in a vacuum-tight manner wherein at least the welding surfaces to be sealed consist of metal and glass, respectively. In this method, a direct joint is established between the metal and the glass without the aid of an intermediate layer of an additional sealing material and without melting of softening of either of the two materials to be joined.

Various methods of sealing metal articles to articles comprising an insulating material in a vacuum-tight manner have already been described. In these known methods use is often made of an auxiliary material constituting an intermediate layer between the articles to be sealed. Methods are also described wherein the joint is established without the use of an auxiliary material. In these methods the joint is established by heating at a temperature at which the welding surface of at least one of the two articles to be sealed is caused to melt or soften whereby the welding surface of the other article is wetted.

In the first case as the drawback is frequently experienced that the intermediate material has a weaker resistance than the composite parts to, for example, vapors to which the assembly is exposed. This may be, for example, the case when the material is used in sodium vapor discharge lamps.

In the second case there is the drawback that distortion which may be disturbing occurs due to melting or softening of at least one of the welding surfaces.

The invention relates to a method preventing these drawbacks of the known methods.

It has been found that metal and glass can directly be sealed in a vacuum-tight manner by pressing together articles of which at least the welding surfaces comprise these materials and subsequently, while maintaining the pressure, heating them at a temperature which is lower than that at which softening or melting of the glass or the metal is effected.

The invention is based on the recognition of the fact that the vapor tension of the metal at the temperature at which the welding surfaces to be sealed are heated for establishing the joint (this temperature is referred to hereinafter as sealing temperature) is of essential significance: the vapor tension of the metal must be higher than $10^{-10}$ Torr at the sealing temperature.

This means, inter alia, that metals whose vapor tension at the softening point is not higher than $10^{-10}$ Torr are not suitable for use in the method according to the invention. Indium and tin are such metals.

This also means that the sealing temperature must be chosen from case to case in such a manner that the vapor tension of the relevant metal at that temperature is higher than $10^{-10}$ Torr.

The present invention relates to a method of sealing articles in a vacuum-tight manner wherein at least the welding surfaces to be sealed consist of metal and glass, respectively, and is characterized in that the welding surfaces of the articles are pressed together and that at least the welding surfaces are heated at a sealing temperature which is lower than the softening point of the glass and which lies between the temperature at which the vapor tension of the metal is equal to $10^{-10}$ Torr and the melting point of the metal.

The pressure to be exerted in the method according to the invention is not bound to narrow limits. This pressure is preferably not less than 5 kg/sq.cm and not more than 150 kg/sq.cm calculated on the welding surfaces being in contact with each other.

If the welding surface of the metal is not free from oxide, it is desirable to use a pressure of at least 50 kg/sq.cm. This has been found from experiments during which lead and zinc were used as metals. It is alternatively possible to use the metal in the form of a powder and in some cases in the form of a powder comprising an oxide of the metal. In the latter case the method is performed in a reducing atmosphere. Before the actual joint is established the oxide is reduced to metal in that case. The use of metal oxide powder is restricted to those oxides whose temperature at which the reduction takes place is lower than the melting point of the metal. Examples thereof are Pt and Fe.

In this connection a metal article is also understood to mean a layer of metal powder and a layer of powder of the metal oxides as mentioned hereinbefore.

The maximum sealing temperature to be used is always chosen to be below the melting point of the metal and when using a metal other than aluminum preferably below a temperature which is 0.9 of the melting point (in °C). The minimum sealing temperature is given by the temperature at which the vapor tension of the relevant metal is more than $10^{-10}$ Torr.

Vapor tension curves of a number of metals are shown for the purpose of illustration in FIG. 1. In this Figure the reference P denotes the vapor tension in Torr and $T/T_m$ denotes the ratio of the temperature (T) at which the vapor tension is given and the melting point ($T_m$) of the metal (both in °C). This Figure shows that lead (Pb) has a vapor tension of $10^{-10}$ Torr just above the ratio $T/T_m = 0.9$. It is still suitable for use in the method according to the invention. On the other hand, zinc reaches a vapor pressure of $10^{-10}$ Torr already for $T/T_m = 0.5$ which means that the minimum sealing temperature is approximately 210 °C for zinc (melting point 419 °C); The minimum sealing temperatures can be found in a corresponding manner for the other metals whose vapor tension curves are shown in FIG. 1.

The sealing temperature to be used in a certain case is also determined by the softening point of the relevant glass. The sealing temperature is chosen to be below the temperature at which the glass would be distorted — also under the influence of the pressure used when performing the method. Consequently, for a hard glass a sealing temperature can be used which is higher than that for a soft glass.

Figure 2:
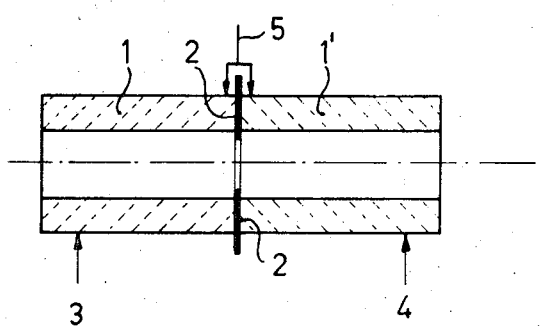

To determine the strength of the joints established by using the method according to the invention round glass tubes 1 and 1' (length 50 mm, internal diameter 6 mm, external diameter 10 mm) as shown in FIG. 2 were joined by a flat metal ring 2 (thickness 0.1 mm). After the joint had been established the tensile strength of the joint was determined at room temperature in a so-called four point bending test, the assembly being supported at the points 3 and 4 and pressure being exerted with the aid of a fork 5 on either side of the joint until fracture occurred. The results for some test are shown by way of example in the Table. The tensile strength B, which is the bending load at fracture, is given in kg/sq.mm.

The Table also shows which materials (glasses and metals) were used, which pressure P (in kg/sq.cm) was exerted when establishing the joint, the temperature T (in °C) which was used and the period $t$ (in minutes) of the sealing treatment.

The joints obtained were tested on vacuum tightness: all of them were vacuum-tight.

The joints were established in an atmosphere of nitrogen or a mixture of nitrogen and hydrogen (75 : 25). This may often alternatively be done in air. Operations were preferably carried out in a reducing or inert atmosphere.

TABLE

| glass - metal - glass | P | T | t | B |
|---|---|---|---|---|
| Quartz-Pt-quartz | 5 | 1280 | 5 | 4.0 |
| quartz-Pb-quartz | 55 | 295 | 2 | 2.5 |
| Py-Pb-Py | 60 | 295 | 2 | 1.8 |
| G 28-Pb-G28 | 130 | 295 | 5 | 2.0 |
| G 28-Pb/Sn-G28 | 130 | 150 | 5 | 1.9 |
| chalk glass-Pb-chalk glass | 100 | 295 | 5 | 2.0 |
| lead glass-Pb-lead glass | 100 | 295 | 5 | 2.2 |
| lead glass-Zn-lead glass | 50 | 400 | 5 | 1.8 |
| lead glass-Zn-lead glass | 125 | 200 | 5 | 1.1 |
| quartz-Fe-quartz | 5 | 1100 | 2 | 4.0 |
| quartz-Al-quartz | 100 | 620 | 2 | 4.0 |

G28 is an alkali aluminoborosilicate glass
Py is a borosilicate glass
Pb/Sn is an alloy of Pb and Sn comprising 38% by weight of Pb, remainder Sn.

The method according to the invention may be used, for example, for establishing vacuum-tight joints in electron valves, for example, electron valves provided with fiber-optic plates, television camera tubes and gas discharge lamps.

What is claimed is:

1. A method of making a vacuum-tight glass-to-metal seal, comprising the steps of placing in abutting contact the surfaces of a glass member and a metal member having a vapor pressure greater than $10^{-10}$ Torr at a temperature less than the softening point of the glass of said glass member, pressing said surfaces together, heating said members at the surface portions thereof to a temperature lower than the softening point of said glass and between the temperature at which the vapor tension of the metal is equal to $10^{-10}$ Torr and the temperature which is the melting point of the metal, and maintaining said pressing and heating until said surfaces are welded together.

2. A method as claimed in claim 1 wherein heating said surfaces comprises a temperature lower or equal to 0.9 of the temperature in °C established as the melting point of the metal when metals other than aluminum are used.

3. A method as claimed in claim 1 wherein pressing said surfaces together comprises pressures between 5 and 150kg/sq cm calculated on the surfaces in contact with each other.

4. A method as claimed in claim 3 wherein said pressure comprises at least 50 kg/sq cm when the metal has a surface not free from oxide.

5. A method as claimed in claim 1 wherein heating said surfaces occurs in an inert atmosphere.

* * * * *